WILLIAM SELLERS.
Improvement in Single Wheel Toy Propeller.
No. 118,977. Patented Sep. 12, 1871.
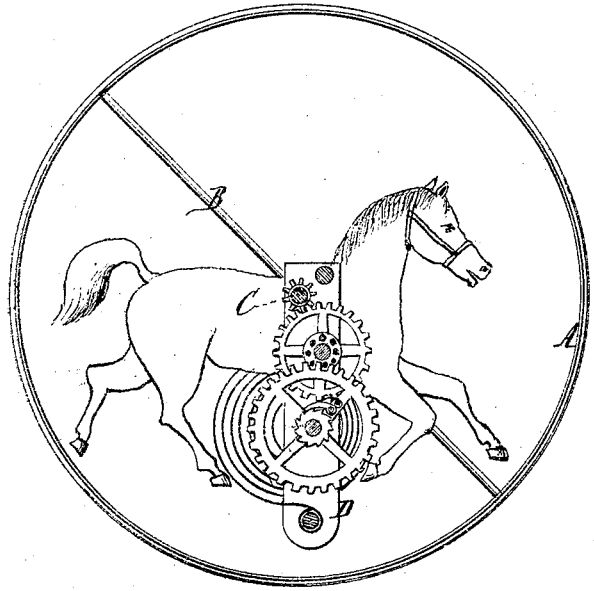
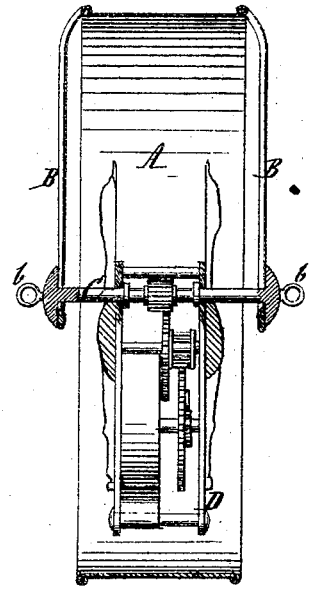
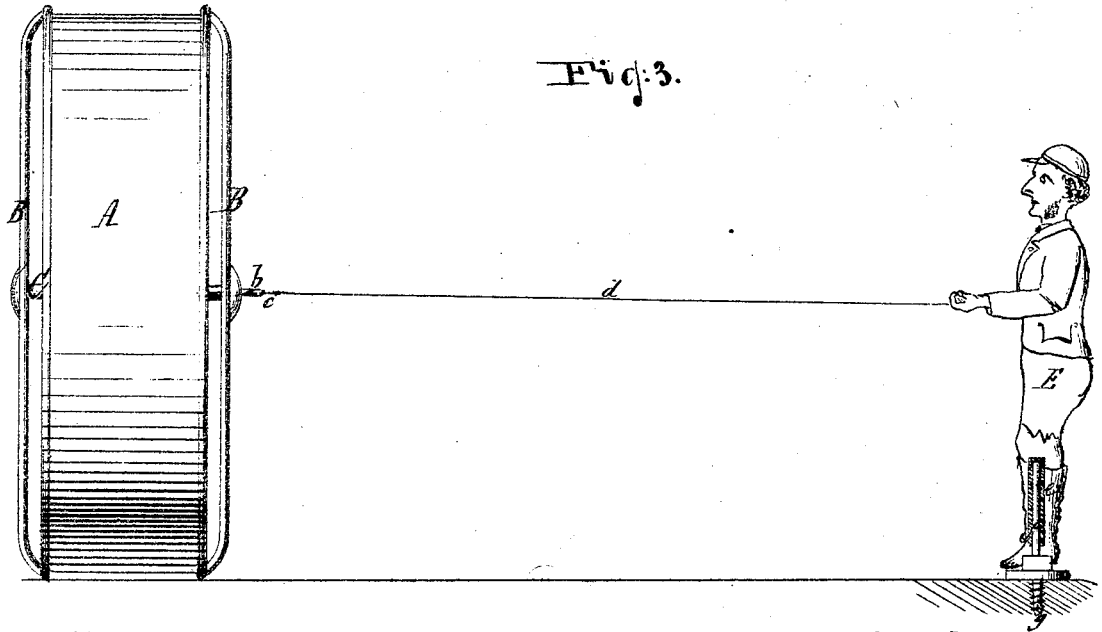
Witnesses.
Inventor
William Sellers

UNITED STATES PATENT OFFICE.

WILLIAM SELLERS, OF NEW YORK, N. Y.

IMPROVEMENT IN SINGLE-WHEEL TOY-PROPELLERS.

Specification forming part of Letters Patent No. 118,977, dated September 12, 1871.

*To all whom it may concern:*

Be it known that I, WILLIAM SELLERS, of the city, county, and State of New York, have invented a new and Improved Single-Wheel Toy-Propeller; and I do hereby declare the following to be a full, clear, and exact description thereof, which will enable those skilled in the art to make and use the same, reference being had to the accompanying drawing forming part of this specification, in which drawing—

Figure 1 represents a sectional side view of this invention. Fig. 2 is a transverse section of the same. Fig. 3 is a side view of the same, showing it in running order.

Similar letters indicate corresponding parts.

This invention relates to a single-wheel propeller, from the axle of which is suspended a frame which turns loosely on the axle, and contains a clock-movement, the motion of which is transmitted to the single wheel by means of a pinion firmly mounted on the axle of said wheel, and geared together with the clock-movement in such a manner that the clock-movement, together with its frame, forms a sort of balance-weight to steady the propeller, particularly when the same is running on a curved or circular path. The axle of the propeller-wheel is firmly mounted in diametrical bars secured to the wheel, one on each side. In the ends of the axle are loops or eyes to receive one end of a cord, the other end of which is secured to a figure mounted on a pin which is firmly secured in the floor of a room, said figure being provided with a socket to fit the pin in such a manner that if the propeller is started it is compelled to run on a circular path the radius of which is determined by the length of the cord extending from the central figure to the axle of the wheel, while the figure itself turns slowly on its pin, following the motion of the propeller-wheel.

In the drawing, A designates a wheel, which is, by preference, made wide enough to stand securely on the ground, but which may be made in any desired width or diameter. On both sides of this wheel are secured diametrical bars B, in which is firmly mounted the axle C. From this axle is suspended a frame, D, which turns loosely on said axle, and which contains a clock-movement or a spring and a train of wheels of any suitable construction. The motion of this clock-movement is transmitted to the axle C, and through it to the wheel A, by means of a pinion, *a*, which is firmly mounted on said axle, and which is in gear with the clock-movement. If the spring is wound up and the wheel is put down on the floor it is caused to roll along on the floor until the power of the spring is exhausted, and during this motion the frame D, together with the clock-movement, acts as a counterpoise-weight or balance, adding to the steadiness of the wheel in its motion. In the ends of the axle C are secured loops or eyes *b*, intended to receive a hook, *c*, which is fastened to one end of a cord, *d*, (see Fig. 3,) and the other end of this cord is secured to a figure, E, representing a man or any other desirable image. This figure is provided with a socket, *e*, capable of being dropped over a pin, *f*, which is secured in the floor by means of a screw, *g*, or in any other desirable manner.

If the propeller is set in motion the cord *d* compels the same to travel in a circular path round the figure E, while the figure follows the motion of the propeller, turning slowly on the pin *f*. While the propeller runs on a circular path the valve of the frame D and the clock-movement as a balance-weight is particularly felt.

By these means a toy is obtained which is very amusing for children.

I am aware that a single-wheel toy-propeller, having gearing operating-wheels which, by frictional contact with the inner surface of the rolling-wheels, propels the latter, is not new. Such I do not claim; but

What I claim as new, and desire to secure by Letters Patent, is—

1. The fixed axle C of the wheel A, carrying the pinion *a*, in combination with the loosely-suspended frame D carrying the clock-gearing, said frame and gearing also forming a counterpoise-weight for the wheel A, the several parts arranged and operating substantially as set forth.

2. The wheel A, braces B, and axle C, carrying the profile figures and pinion *a*, in combination with the loosely-suspended frame D carrying the clock mechanism, all arranged to operate substantially as set forth.

3. The figure E revolving on a fixed pin, *f*, in combination with the cord *d* connected to the axle of the wheel A, substantially as and for the purpose set forth.

WILLIAM SELLERS.

Witnesses:
W. HAUFF,
E. F. KASTENHUBER.